(12) United States Patent
Ian Cannon

(10) Patent No.: US 6,532,707 B1
(45) Date of Patent: Mar. 18, 2003

(54) STRUCTURAL SYSTEMS AND ELEMENTS THEREFOR

(75) Inventor: Humphrey Richard Ian Cannon, Brassington (GB)

(73) Assignee: Armillatox Limited, Alfreton (DE)

( * ) Notice: Subject to any disclaimer, the term of this patent is extended or adjusted under 35 U.S.C. 154(b) by 0 days.

(21) Appl. No.: 09/616,935

(22) Filed: Jul. 14, 2000

(30) Foreign Application Priority Data

Jul. 16, 1999 (GB) .............................. 9916625

(51) Int. Cl.[7] .............................. F16B 5/12; F16B 1/00
(52) U.S. Cl. .................. 52/271; 52/270; 52/281; 52/282.1; 52/282.2; 52/585.1; 312/111; 312/257.1
(58) Field of Search ................ 52/252.2, 396.08, 52/396.09, 402, 562, 582.1, 585.1, 379, 378, 281, 282, 270, 271; 446/1; 312/111, 257.1

(56) References Cited

U.S. PATENT DOCUMENTS

| | | | | |
|---|---|---|---|---|
| 1,365,753 A | * | 1/1921 | Vought ........................ 52/282 |
| 1,416,919 A | * | 5/1922 | Wickson .................... 52/582.1 |
| 1,477,867 A | * | 12/1923 | Dodson ........................ 52/379 |
| 1,495,439 A | * | 5/1924 | Reagan ...................... 52/582.1 |
| 1,716,626 A | * | 6/1929 | Devol ........................ 52/284 |
| 1,835,524 A | * | 12/1931 | Rinehart et al. ........... 52/506.1 |
| 3,148,230 A | * | 9/1964 | Behner ........................ 52/282 |
| 3,451,183 A | * | 6/1969 | Lespagnol et al. ......... 52/282.2 |
| 3,511,004 A | | 5/1970 | Snellings |
| 3,687,512 A | * | 8/1972 | Alston ........................ 312/330 |
| 3,879,914 A | * | 4/1975 | Haller et al. ................. 52/745 |
| 4,099,815 A | | 7/1978 | Cox et al. |
| 4,145,854 A | * | 3/1979 | Rodahl et al. ................. 52/228 |
| 4,147,001 A | * | 4/1979 | Oliver ........................ 52/284 |
| 4,162,114 A | * | 7/1979 | Litchfield et al. ....... 312/330 R |
| 4,382,046 A | * | 5/1983 | Frohwerk .................... 261/94 |
| 4,388,786 A | * | 6/1983 | Gassler ........................ 52/282 |
| 4,683,674 A | * | 8/1987 | Faul .............................. 47/83 |
| 4,778,309 A | * | 10/1988 | Bach et al. .................... 405/25 |
| 4,915,540 A | * | 4/1990 | Kennedy et al. ............. 405/132 |
| 5,155,961 A | * | 10/1992 | Bardo .......................... 52/646 |
| 5,412,918 A | * | 5/1995 | Wendel et al. ............. 52/582.1 |
| 5,471,806 A | * | 12/1995 | Rokhlin ........................ 52/437 |
| 5,493,839 A | * | 2/1996 | Sax et al. ................. 52/793.11 |
| 5,511,345 A | * | 4/1996 | Jones et al. .................... 52/136 |
| 5,634,300 A | * | 6/1997 | Huebner et al. ............. 52/36.1 |
| 5,647,181 A | * | 7/1997 | Hunts ........................ 52/282.1 |
| 5,706,620 A | * | 1/1998 | Zen ............................ 52/220.2 |
| 5,797,235 A | * | 8/1998 | Bowerman et al. ........ 52/582.1 |
| 6,099,411 A | * | 8/2000 | Van Wagenen ............. 472/136 |
| 6,176,053 B1 | * | 1/2001 | Germain ...................... 52/232 |
| 6,202,867 B1 | * | 3/2001 | Di Blasi et al. ............. 211/188 |
| 6,250,022 B1 | * | 6/2001 | Paz et al. .................... 52/79.5 |
| 6,250,035 B1 | * | 6/2001 | Bristow et al. ............. 52/506.1 |

FOREIGN PATENT DOCUMENTS

| | | | |
|---|---|---|---|
| EP | 0047832 | | 3/1982 |
| FR | 2576624 | * | 8/1986 .............. 312/257.1 |
| FR | 2 596 821 | | 10/1987 |
| GB | 0908260 | | 10/1962 |
| GB | 1378299 | | 12/1974 |
| GB | 1603980 | | 12/1981 |
| GB | 2142058 | | 1/1985 |
| NL | 2350779 | * | 4/1975 .................. 52/281 |

* cited by examiner

Primary Examiner—Lanna Mai
Assistant Examiner—Phi Dieu Tran A
(74) Attorney, Agent, or Firm—Collard & Roe, P.C.

(57) ABSTRACT

A structural system comprises a set of elements including two or more plank members 10, which are preferably hollow and divided by interior partitions 12 into longitudinally extending compartments 13. The plank members 10 are open at each end, and are interconnected by connectors 20, comprising a stem 21, and two arrays of projections which may be aligned for in-line connection of the plank members, or set of right angles to form a corner, or have three arrays to provide a T-connection. The plank members 10 are connected vertically by rods 26 which pass through aligned apertures 14 in the plank members and notches 25 in the projections.

5 Claims, 3 Drawing Sheets

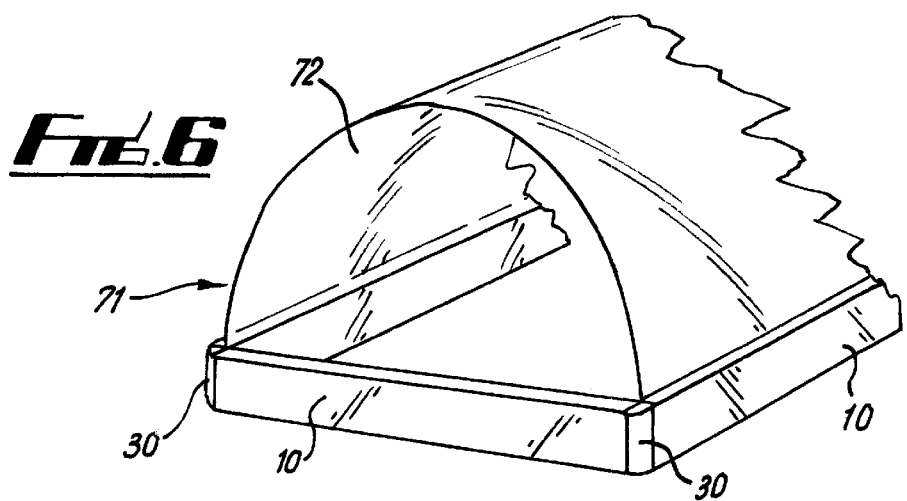
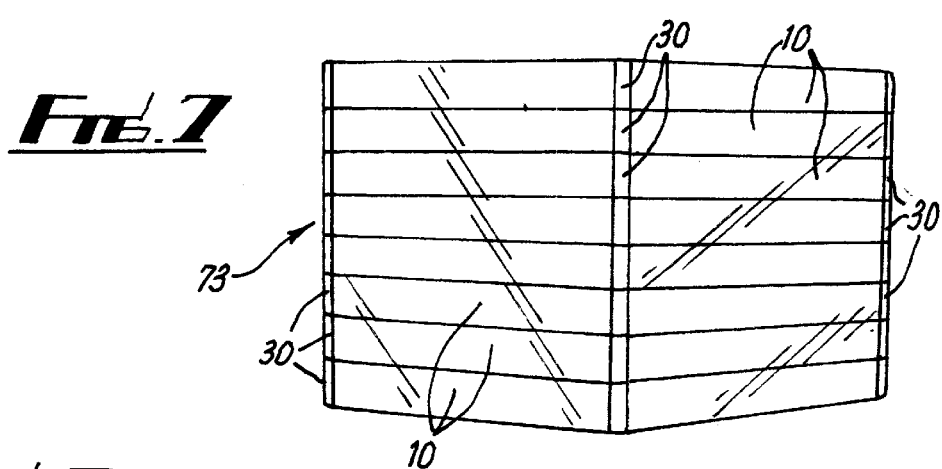
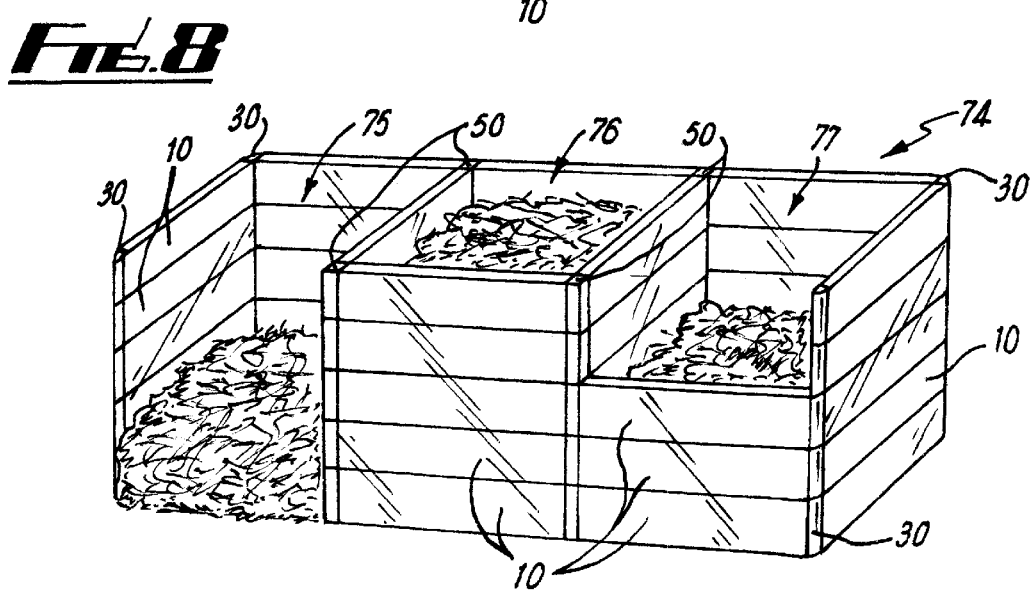

STRUCTURAL SYSTEMS AND ELEMENTS THEREFOR

This invention relates to structural systems and elements for use in the construction of such systems.

The invention is particularly concerned with the provision of structures which may be advantageously for use in horticulture or the like making use of recycled materials, especially recycled plastics which can be used in the manufacture of the elements from which the structures are made, although it is not restricted to the use of such recycled materials and first use materials, such as suitable plastics, or metals may be used. In certain uses, such as horticulture, clear plastics may be of utility.

It is an object of the invention to provide elements for use in the construction of structural systems which can be assembled from a small range of simple components, without skilled labour to provide a wide range of such structures.

According to one aspect of the invention, a set of elements for use in the construction of a structural system comprises two or more plank members which have hollows or voids in at least part thereof, and each open towards a respective end of the plank, and one or more connector members each comprising a body and a plurality of projections, each connector having at least one projection located to enter into a respective hollow or void of at each of at least two plank members, to connect said plank members.

The plank members each preferably comprise a plastics extrusion of uniform cross-section throughout the length of each plank member, and this may comprise a hollow rectangular section, subdivided by partitions or dividing walls into for example longitudinally extending compartments which form the hollows or voids which are open at each end of the plank member to receive projections of one or more connector members. The form of extrusion allows the plank member to be relatively light in weight, whilst the subdividing partitions or walls strengthen the plank member against compression exerted in the direction of the dividing walls.

The connector member or members may each comprise a hollow or solid plastics body providing a stem, and formed with at least two arrays of projections for insertion into the open ends of the longitudinal compartments of two different plank members, so as to join the plank members together.

Connector members may be provided in each of a range of forms for effecting different types of connection. For connection of two plank members in an end-to-end straight line arrangement, the projections are preferably aligned on opposite sides of a square or rectangular stem. For connection of two plank members at right angles, to form a corner, the projections are set at mutual right angles, on adjacent sides of a square or rectangular stem. On the other hand, the stem may be formed as a curved member with end faces formed which are at right angles to each other, and carrying the projections.

In further embodiments of connector member, the connector may provide a 'T' connection for three plank members. In addition, provision may be made for connections at angles other than right angles, such as 60 or 120 degrees. A modification of the connector comprising a stem with only one set of projections may be provided as a trim to 'finish' an exposed end of a plank member.

Plank members may be connected vertically by means of rods which pass through apertures in the projections. These apertures may be in the form of closed holes, but for ease of manufacture, are preferably slots which open to one edge of the projections.

From another aspect, the invention provides a structural system constructed from a set of elements according to the first aspect of the invention. Such horticultural structures may include for example a raised bed, or a sand pit wherein a single tier of plank members is secured together to form a low wall around a specified area, using both right angle (corner) connectors and straight-line connectors. The volume may then be filled with a soil/loam/humus/compost material or mixture to form a raised bed, or sand to form a sand pit.

A structure of two or three superimposed tiers of plank members may be used as a pet run, to define an area in which a pet animal may be exercised, from rodents to small dogs. The height and extent of the enclosure will generally be related to the species involved.

A simple high walled structure including for example up to ten or more tiers of plank members may be provided as a bin for collection and storage of garden or other rubbish, whilst a complex structure comprising a plurality of interconnected compartments of similar height to the bin may be designed as a compost installation. Such a compost installation may comprise for example three compartments, one or collection of current organic garden refuse, a second for compacting and maturing compost collected from a previous period, and a third for extraction of matured compost for use.

A single tier structure may also be used as the basis for a cloche, in combination with a glass or clear plastics cover.

Preferred embodiments of structural systems and elements for use in constructions of such systems will now be described by way of example only, with reference to the accompanying drawings, wherein:

FIG. 6 is a perspective view of a horticultural structure according to the invention in the form of a cloche;

FIG. 7 is a perspective view of a horticultural structure according to the invention comprising a bin for collection of garden refuse; and FIG. 8 is a perspective view of a horticultural structure according to the invention comprising a compost installation for a garden.

The drawings illustrate embodiments of horticultural constructions according to the invention and individual elements of a set of construction elements according to the invention, by way of example only.

Figure 1:
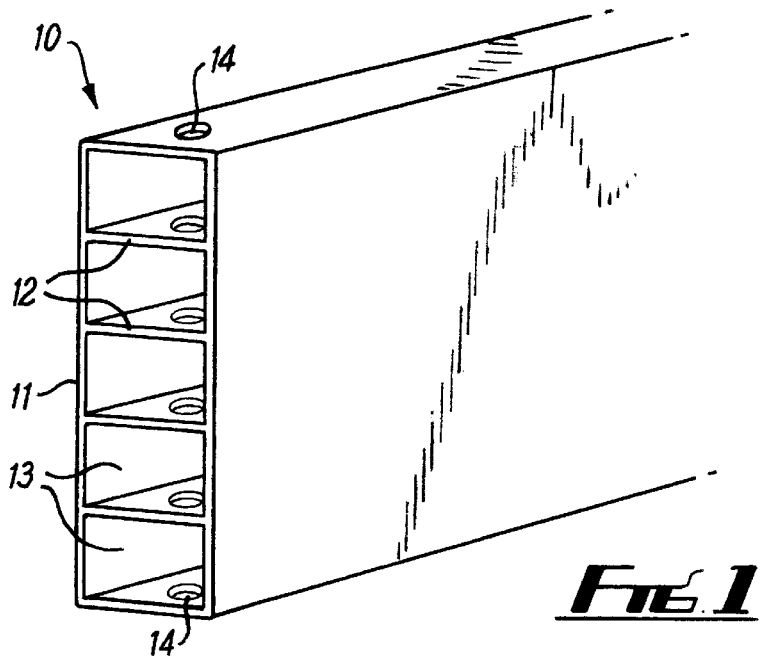
FIG. 1 is a perspective view of an end of a typical plank member forming part of a set of elements according to the invention.

FIG. 1 shows a plank member 10 which is a basic construction element of the invention. This comprises a moulding or extrusion of plastics, which may be clear or opaque and are preferably recycled plastics of any required length and of constant cross-section. As shown, the plank member 10 comprises an external shell 11 of rectangular cross-section, subdivided by partitions or webs 12 to form a plurality, e.g. five, of voids 13 which are open at each end of the plank member. Such plank members can be made to be of any desired dimensions and provided in any colour and be made from any suitable plastics material or blend of plastics materials to obtain required strength, rigidity or flexibility properties using recycled or first use plastics materials.

Each of the partitions 12 and the end walls of the shell are formed with a hole 14. This is provided to enable fastening of the plank member 10 to a connector member as further described below.

Figure 2:
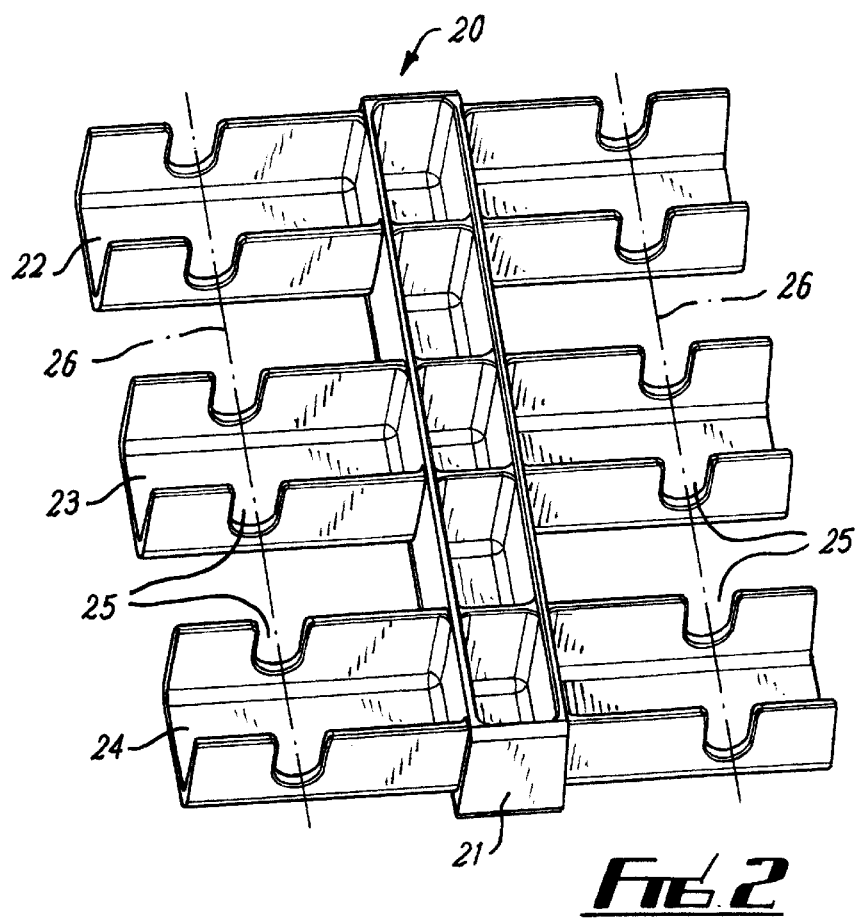
FIG. 2 is an elevation view of a connector member for joining two such plank members in an end-to-end straight line arrangement.
Figure 3:
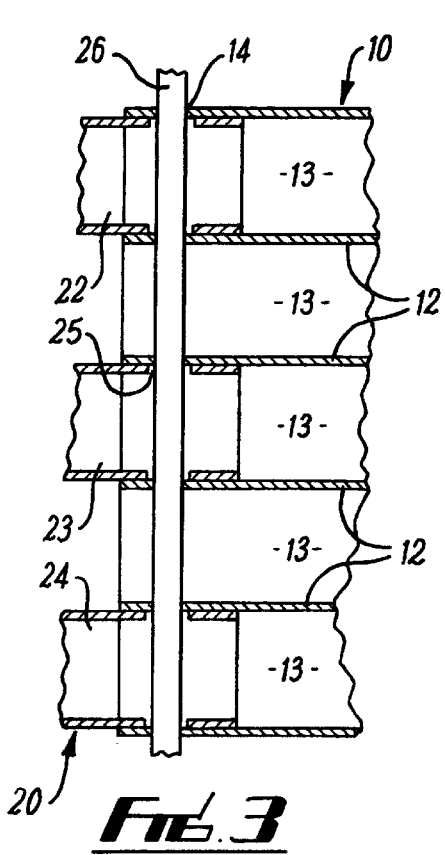
FIG. 3 is a sectional view of part of the connector member of FIG. 2 showing also an end of a plank member.
Figure 4:
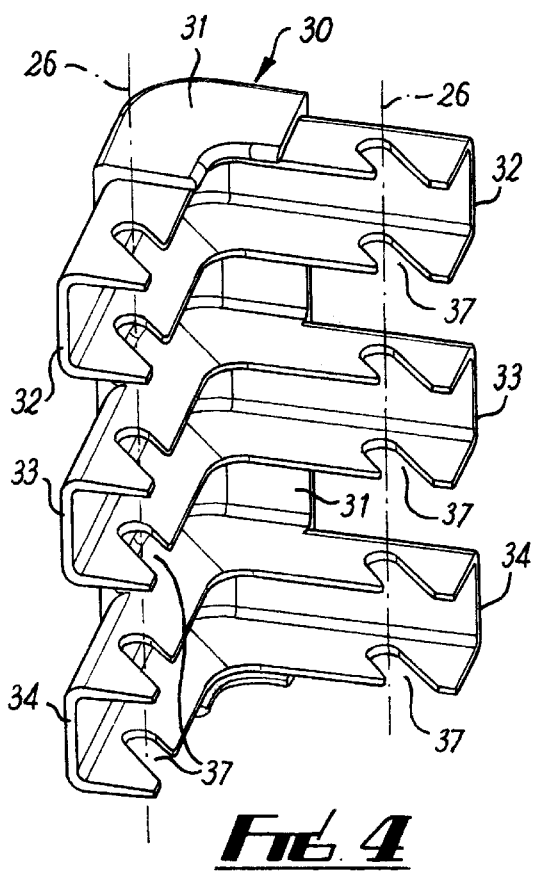
FIG. 4 shows a perspective view of a connector member for joining two plank members at right angles, for example at a corner of a structure.

FIGS. 2 and 4 illustrate two different connector configurations. FIGS. 2 and 3 illustrate a first connector 20, which is for connecting plank members 10 in end-to-end straight line relationship. Connector 20 comprises a bracket 21 from which three spaced channel members 22, 23, 24 extend, each with two webs with open ended slots 25 towards each end. The members 22, 23, 24 enter into three of the five voids 13 in the plank member 10. FIG. 3 shows connector 20 with a plank member 10 with the projections 24 inserted into the voids 13 of the plank member.

Slots 25 which are each open to one side of the projection, as shown in FIG. 3, cooperate with the holes 14 in the end of the respective plank member to form a passage through which a connector rod 26 or dowel, which may be of metal or a suitable strong plastics material, is passed. The rod 26 unites the connector 20 to the plank member 10, and is prevented from exiting the slots 25 in the connector by the holes 14 in the plank member. Connector rods 26 may extend to effect a vertical connection between several superposed tiers of plank members.

FIG. 4 illustrates a variant from of connector 30, for use at corners, joining two plank members at right angles to each other. Connector 30 comprises a curved body 31 carrying three channel shaped projections 32, 33, 34 for entering into three of the five open end voids 13 of a respective plank member 10. In addition, the projections 32, 33, 34 each have two webs each with a slot 37 open to one side of the projections for receiving, in cooperation with holes 14 in the end of the plank member, respective connector rods 26, which, as noted in connection with FIGS. 2 and 3, may extend vertically to connect a plurality of superposed tiers of plank members and are here shown as broken lines.

Variant connectors, not illustrated, which maybe used in special situations include a cruciform connector for joining four plank members 10 at mutual right angles, and this may comprise a cruciform body 41 formed with projections in the same manner as those described in connection with FIGS. 2 and 3, and 4, including the provision of slots in the projections 46. Another possibility is a T-connector, which has a T-shaped body with projections 55 in the same manner as the preceding embodiments of connector member, including the provision of slots in the projections.

In a further variant, the basic connector member design may be modified for use as an end trim for any exposed (unconnected) plank member ends. This comprises a body with one set of projections 62 on one side for entry into the open ends of voids in the plank member 10. The projections each have a slot, this arrangement being the same as that described for the connector members.

Whilst the connector members 20, 30 are shown as being configured to connect a single tier of plank members, it is possible for them to be made of any required length, to join a plurality of superimposed tiers of plank members. This also applies to the end trim body.

FIGS. 5 and 6 and 7 and 8 each show a different possible horticultural structure made using elements such as those described above.

Figure 5:
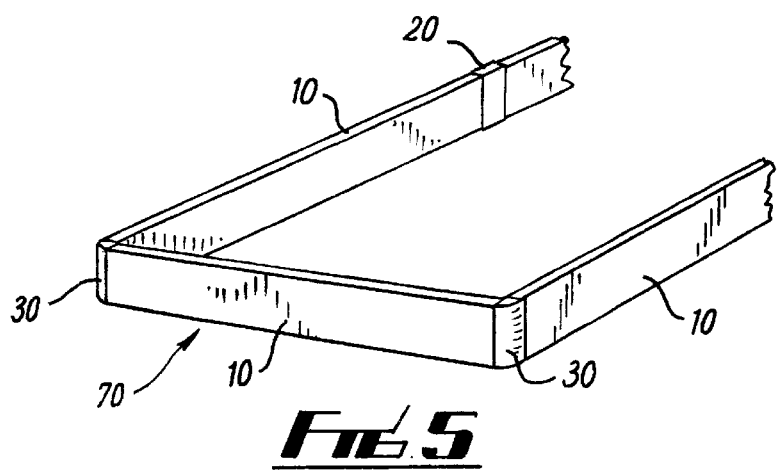
FIG. 5 is a perspective view of a horticultural structure according to the invention in the form of a raised bed.

In FIG. 5, a raised planting bed is constructed by forming a perimeter fence 70 from a single tier of plank elements 10, with corner connectors 30 and end-to-end connectors 20. The enclosure is then filled with a suitable plant growing medium such as humus, or a blend of humus and natural soil constituents, suitable for the crop or ornamental plants intended to be grown.

In FIG. 6 is shown a cloche or cold frame 71 wherein a base is formed by a single tier of plank members 10, with corner connectors 30 etc., with a cover 72 of a suitable glass or plastics transparent or translucent material.

FIG. 7 shows a view of an enclosure 73 for use as a bin for collection of garden refuse. This comprises four walls (two not shown) each of several tiers of plank members 10, connected with corner connector members 30, which are each preferably of an extended variant with a single long stem with connectors for all of the tiers of plank members 10.

Finally, FIG. 8 is a view of a horticultural structure comprising a composting installation 74, having three compartments 75, 76, 77 defined by walls each constructed of tiers of plank members 10 with corner connectors 30, and three way T-connections 50 where indicated. The front walls of the compartments are made so that the plank members 10 can be removed and replaced as required, so that, as shown by way of example, one compartment such as 77 can be partially walled up for collection of current organic refuse, a second compartment 76 can be walled up for maturing refuse collected during a previous period, into compost, and a third compartment 75 may be open at the front for the removal of fully matured compost for use.

Variations to the design and configuration of the construction elements may be made within the scope of the invention, particularly with regard to the number of voids and projections used, and the shapes of various components. Also, the above instances of horticultural constructions are given as non-limiting examples, and the configuration and purpose of these may be varied within the scope of the invention.

What is claimed is:

1. A set of elements for construction of a structure, comprising:

at least two hollow plank members divided by longitudinal interior partitions into longitudinally extending vertically stacked compartments, each open at each end;

at least one connection, each connection comprising a stem and having an array of projections on each of at least two sides of said stem, each array adapted for insertion of its respective projections into the open end of a respective compartment of one of said plank members;

said projections of each array being formed with aligned apertures which are alignable with further correspondingly aligned apertures in said ends and partitions of said plank members, to define a passage extending through all the projections and partitions parallel to the stem; and a rod or dowel member for passing through said passage to join said plank members and said connectors.

2. A set of elements according to claim 1, wherein said apertures in said projections comprise open slots, and wherein said apertures in said partitions comprise holes.

3. A set of elements according to claim 1, wherein said arrays of projections on said connector are formed in alignment on opposed faces of said stem.

4. A set of elements according to claim 1, wherein said arrays or projections on said connections are provided upon and extend from faces of said stem substantially mutually at right angles.

5. A set of elements according to claim 1, wherein said projections of said connections comprise channel sectioned members.

* * * * *

UNITED STATES PATENT AND TRADEMARK OFFICE
CERTIFICATE OF CORRECTION

PATENT NO. : 6,532,707 B1
DATED : March 18, 2003
INVENTOR(S) : Cannon

It is certified that error appears in the above-identified patent and that said Letters Patent is hereby corrected as shown below:

<u>Title page,</u>
Item [73], the country of the assignee correctly should read -- Alfreton, England --.

Signed and Sealed this

Twenty-fifth Day of November, 2003

JAMES E. ROGAN
*Director of the United States Patent and Trademark Office*